B. ARISTOSA.
WALKING PLOW.
APPLICATION FILED NOV. 9, 1915.
1,182,236.
Patented May 9, 1916.
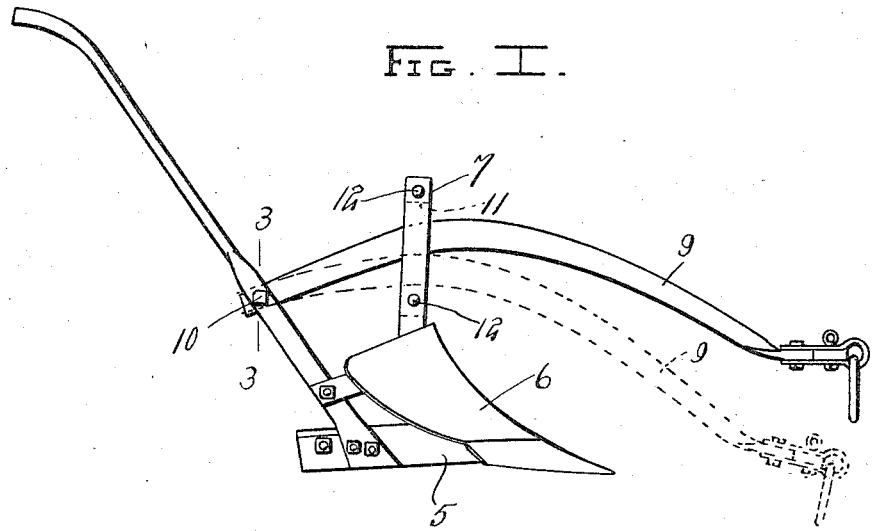
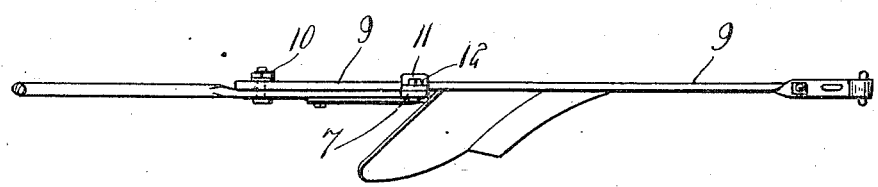
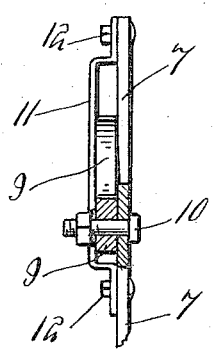

UNITED STATES PATENT OFFICE.

BONIFARIO ARISTOSA, OF ILOILO, PHILIPPINE ISLANDS.

WALKING-PLOW.

1,182,236.     Specification of Letters Patent.     Patented May 9, 1916.

Application filed November 9, 1915. Serial No. 60,582.

*To all whom it may concern:*

Be it known that I, BONIFARIO ARISTOSA, a citizen of the United States, residing at Iloilo, in the Province of Iloilo, Philippine Islands, have invented certain new and useful Improvements in Walking-Plows; and I do hereby declare the following to be a full, clear, and exact description of the invention, such as will enable others skilled in the art to which it appertains to make and use the same.

This invention relates to new and useful improvements in plow structures, particularly of the type embodied in Patent #1,020,232 granted to A. Varges, March 12, 1912.

It is the object of the present invention to so pivotally mount the plow beam that the angle of the beam with relation to the handle portion of the device, which determines the depth at which the plow point works, may be adjusted by the operator as desired while working the plow, and without the necessity of providing any means for locking the beam, this advantage being procured by so securing the beam that a greater leverage may be had by the handle portion of the plow. It is desirable to state that the present plow structure is of light type and is adapted for use under such conditions described in the said patent wherein an easily worked soil is found.

It is further an object to provide such a modified structure which may be very readily adapted to the plow in the previous patent.

With the above and other objects and advantages in view, the invention resides more particularly in the novel combination, formation and arrangement of parts as more fully described hereinafter and pointed out in the appended claim.

Reference is had to the accompanying drawings, wherein similar characters of reference designate corresponding parts throughout the several views, and in which:—

Figure 1 is a side elevation of the improved plow structure, showing an adjusted position in dotted lines; Fig. 2 is a top plan view of the plow structures; Fig. 3 is a vertical sectional view taken on the line 3—3 of Fig. 1.

Referring now more particularly to the accompanying drawings there is shown a plow of the general structure embodied in the aforesaid patent to Varges and comprising the land side 5 carrying a mold board 6. A plow stock 7 extends upwardly from the forward end of the land side and a handle bar extends diagonally upward from the rear end thereof. A plow beam 9 is provided, but this beam instead of being pivoted to the plow stock is pivoted to the handle bar at 10 and has its intermediate portion slidably held adjacent the plow stock by a bracket comprising a metal strap 11 having its ends offset inwardly and bolted at 12 to the said stock. Thus in the operation of the plow, the pressure exerted by the operator on the handle bar determines the depth at which the mold board works and as this pressure is varied, the depth of the mold board is adjusted. This operation could perhaps be obtained in the plow embodied in the patent to Varges, by removing the securing bolt of the rear end of the beam, but there would not be provided as efficient a leverage as in the present device.

What is claimed is:—

In a plow, the combination with a land side portion having a stock extended upwardly from its forward portion and a handle bar secured to its rear portion of a plow beam pivoted to the handle bar and slidably held with relation to said stock.

In testimony whereof, I affix my signature, in the presence of two witnesses.

BONIFARIO ARISTOSA.

Witnesses:
BINFOROSO GALEGA,
FELIX GANZÓN.

Copies of this patent may be obtained for five cents each, by addressing the "Commissioner of Patents, Washington, D. C."